United States Patent [19]

Engelke et al.

[11] Patent Number: 4,521,354
[45] Date of Patent: Jun. 4, 1985

[54] METHOD AND MOLD FOR FABRICATING AN AERODYNAMIC AIRFRAME STRUCTURE

[75] Inventors: Claude W. Engelke; Gerald E. Sutton; Steven E. Potter, all of Wichita, Kans.

[73] Assignee: The Boeing Company, Seattle, Wash.

[21] Appl. No.: 564,850

[22] Filed: Dec. 23, 1983

Related U.S. Application Data

[63] Continuation-in-part of Ser. No. 361,848, Mar. 25, 1982, abandoned.

[51] Int. Cl.³ .................. B29D 27/00; B29F 1/03; B29F 1/06
[52] U.S. Cl. .................. 264/46.6; 264/46.9; 264/328.6; 264/328.12; 264/DIG. 83; 425/543; 425/573
[58] Field of Search ............ 264/46.8, 46.6, DIG. 83, 264/328.6, 328.12, 46.9; 425/573, 543

[56] References Cited

U.S. PATENT DOCUMENTS 4,268,571  5/1981  McCarthy .................. 264/46.9 X
4,303,728  12/1981  Houdek et al. .............. 264/46.8 X

OTHER PUBLICATIONS

Wirtz, H. "Progress in RIM Technology for Automobile Components" in *Plastics and Rubbers Processing*, vol. 1, No. 4, Dec. 1976, pp. 167-170.

Primary Examiner—Philip Anderson
Attorney, Agent, or Firm—Edwin H. Crabtree

[57] ABSTRACT

A method and a mold for fabricating an aerodynamic airframe structure or the like. The method using foam material introduced into the mold having split halves. The mold constructed for receiving a prefabricated stiffener skin. The mold acts as a backup restraint for the airframe structure or any other part being produced. The foam injected into the cavity adheres to the stiffener skin thereby forming an elastic foundation of continuous support for the stiffening element.

5 Claims, 8 Drawing Figures

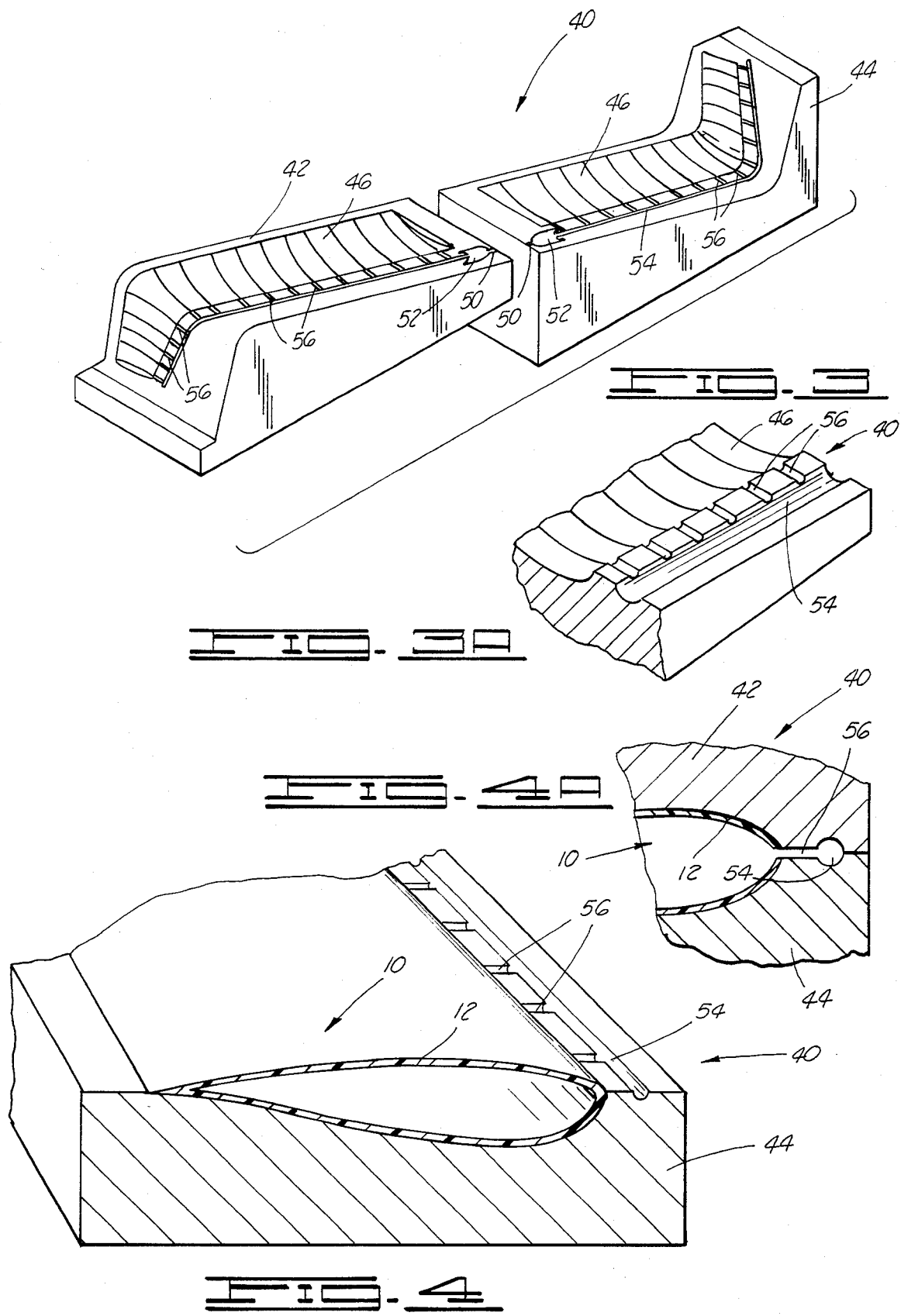

METHOD AND MOLD FOR FABRICATING AN AERODYNAMIC AIRFRAME STRUCTURE

BACKGROUND OF THE INVENTION

The invention described in this application is a continuation-in-part of patent application, Ser. No. 361,848 entitled Method And A Mold For Fabricating An Aerodynamic Airframe Structure, filed on Mar. 25, 1982 and now abandoned.

The subject invention relates to an improved method and mold for fabricating an aerodynamic airframe structure and more particularly but not by way of limitation to a method using a split mold having a cavity formed therein for receiving an external stiffener skin used for receiving foam material therein and forming a lightweight airfoil structure.

Heretofore, the development of an airfoil structure for lightweight aircraft, drones, or autonomous missiles produced in mass quantity for interchangability required design and manufacturing techniques which must meet requirements for structural integrity. This method utilizes mold clamps and automated mixing equipment which greatly reduces manufacturing time per part. The technique for design and manufacturer of the critical airfoil structure, i.e. wing, canard and control surfaces described herein enabled the production of these vehicles for meeting the necessary requirements.

Conventional means of fabricating lightweight airfoil structures usually incorporate machining or forming a center core to shape. Core material historically has been a honeycomb core made of aluminum, "Nomex" reinforced fiberglass or styrofoam. The usual techniques first shape the core, followed by wrapping the core with reinforcing fabric of cloth, impregnated with a thermal setting resin matrix of polyester or epoxy. These fabrication methods and core materials are both labor intensive and costly for high volume manufacturing. The subject improved method of fabricating an aerodynamic airframe structure eliminates the above mentioned problem.

SUMMARY OF THE INVENTION

The subject method of fabricating an aerodynamic airframe structure provides means for high volume fabrication at a low cost using cost effective material with rapid part fabrication.

The invention also lends itself for interchangability and repeatability of the unique process using automated manufacturing tools.

The mold is fabricated for producing an aerodynamic airframe structure and the like and includes an upper half and a lower half. The split mold halves are indexed together with an entrance therein. The split mold halves include a cavity designed for receiving an internal or external stiffener or internal or external skin or a combination thereof. The split halves include an extrance connected to a runner along one side of the cavity and a series of gates joining the runner to the cavity. The gates are coordinated with the external stiffener skin for receiving foam material therein. The foam material fills the cavity and adheres to the skin stiffener forming a bond which generally has greater adhesive strength than the cohesive strength of the foaming material itself. The mold acts as a backup support for the internal molded structure inside the external stiffener skin.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 3 and 3A illustrate the mold used in the subject invention.

FIGS. 4 and 4A illustrate views of the mold, runner and gates leading into the external stiffener skin in place in the mold.

DETAILED DESCRIPTION OF THE DRAWINGS

Figure 1:
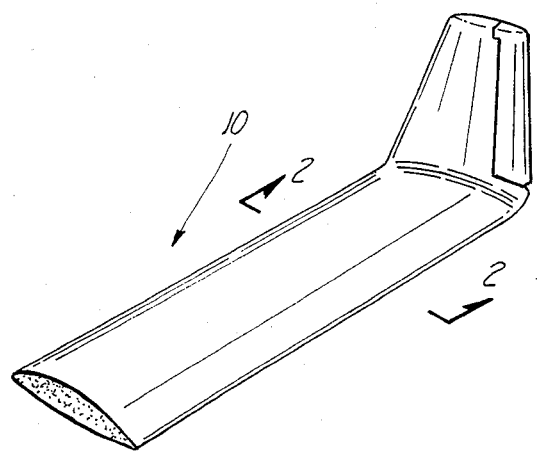
FIG. 1 illustrates an aircraft wing formed by the subject invention and incorporating the external wing stiffening skin.
Figure 2:
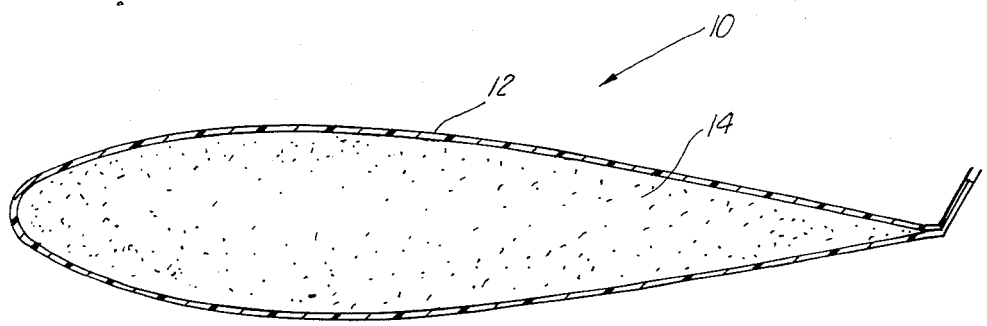
FIG. 2 is a cross-section taken along lines 2—2 shown in FIG. 1.

In FIG. 1 a typical aerodynamic surface such as a wing is shown and designated by general reference numeral 10. Taken along lines 2—2 and shown in FIG. 2 is a cross-section of the wing 10 which incorporates a prefabricated external stiffener skin 12 which is filled with a specified density of polyurethane foam. It should be kept in mind while the external reinforced stiffener skin 12 is shown, also an internal stiffening structure or the like can be inserted therein for providing additional reinforcement or design features of the wing 10. The combination of the external skin 12 and the internal foam 14 form an internally stiffened structure. The foam 14 is molded in place by a process known as reaction injection molding.

Figures 2A, 2B:
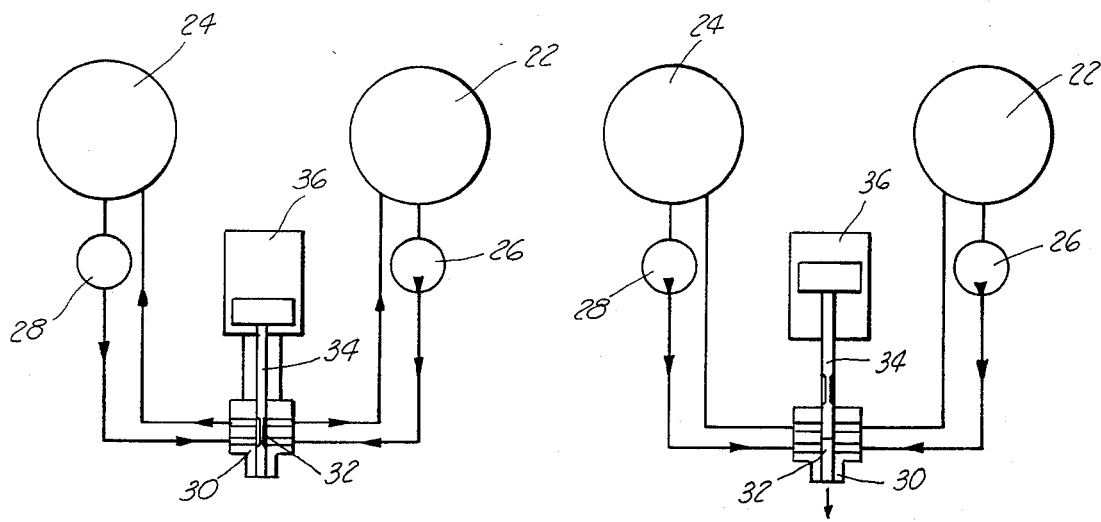
FIGS. 2A and 2B illustrate the equipment used in mixing the foam material.

A machinery schematic of a method of manufacturing, using reaction injection molding is shown in FIGS. 2A and 2B. Iso and poly are stored in separate holding tanks 24 and 22 respectively. Iso represents the common accepted acronym for isocyanate of the urethane material. This is stored in the holding tank 24. Poly represents the common accepted acronym for polyol or the resin side of the urethane which is stored in the tank 22. The polyol components of the resin usually contains additives and blowing agents.

Metering pumps 26 and 28 are used to proportion the material from the tanks 22 and 24 into a mixhead 30. The mixhead 30 contains a mixing chamber 32 and a cleaning piston 34 which serves to control the function of the process. In FIG. 2A the piston 34 is in a downward extended position. In the downward position relative to the cylinder 36 the material is circulated through the mixhead 30 and back into the holding tanks 22 and 24.

Referring now to FIG. 2B, the cleaning piston 34 is in a retracted upward position which allows the material to be mixed by impingement in the mixing chamber 32.

FIGS. 3 and 3A illustrate the mold for producing the aerodynamic airframe structure. The mold is shown and designated by general reference numeral 40. The split mold 40 includes an upper half 42 which is indexed with a lower half 44. The halves 42 and 44 when placed together form a cavity 46 which forms the mold itself and acts as a restraining fixture for the airframe wing 10 therein when the halves 42 and 44 are placed together. The lower half and upper half further include an entrance 50, an aftermixer 52, a runner 54 and a plurality of gates 56 which provide entrances from the runner 54 to the cavity 46.

The mixed foam 14 must be directed under control flow velocity. This control is accomplished by means of the properly designated gates 56 and runner 54. The foam 14 enters the mold 40 through the entrance 50 from the mixhead 30. The mixed foam 14 then enters the aftermixer 52 which serves two primary purposes. They are to insure no unmixed material which might result from the lead or lag phenomenon entering the cavity 46, resulting in improperly mixed areas in the finished part and to redirect the flow velocity from turbulant to laminer flow in the runner 54.

In FIGS. 4 and 4A the stiffener skin 12 can be seen in place in the mold 40 prior to receiving the foam material 14.

From the runner 54, the foam material 14 passes through a series of gates 56. The mold cavity 46 with the skin 12 received therein is filled with the foam 14 adhering to the skin forming an integrally stiffened aerodynamic airframe structure 10. The skin 12 is aligned such that injection holes in the skin 12 are aligned with the gates 56. The foam 14 forms a bond to the skin 12 thus completely eliminating the need for an adhesive bond material. It has been found that the self bonding of the foam 14 to the skin 12 is actually stronger than the basic foam material itself. This is to say that the bond fails cohesively rather than adhesively.

The integral structure 10 is then allowed to cure and cool within the mold halves 42 and 44. The finished structure 10 is then removed from the mold 40 completing the process of providing a unique method of forming and fabricating an aerodynamic airframe structure. The structure formed in the above mentioned mold 40 is of a single density type having an overall gross density. This is to say the total weight of a "shot", the shot being the amount of material to fill the cavity 46 divided by the total volume of the cavity 46. The density varies through the thickness but does not vary along the length or width of the structure.

Changes may be made in the construction and arrangement of the parts or elements of the embodiments as described herein without departing from the spirit or scope of the invention defined in the following claim.

What is claimed is:

1. A method of fabricating an aerodynamic airframe structure and the like using a mold having halves with a cavity formed therein, the cavity designed for receiving an external stiffener skin having injection holes along the length thereof, the mold further having an entrance connected to a runner along one side of the cavity and a series of gates joining the runner to the cavity and indexed with the injection holes, the steps including:
   mixing a foam material in a mixing chamber;
   introducing the mixed foam material under pressure into the entrance of the mold;
   feeding the mixed foam material along the length of the runner and through the gates;
   filling the external skin in the cavity from the gates through the injection holes with the foam material, the foam material adhering to the skin and forming an elastic foundation for the external skin; and
   curing the airframe structure and removing the halves of the mold therefrom.

2. The method as described in claim 1 wherein the mold includes an aftermixer therein and between the entrance and the runner for mixing the foam material prior to feeding the material along the length of the runner.

3. The method as described in claim 1 further including the step of circulating the foam material in holding tanks prior to mixing the material in the mixing chamber.

4. A method of fabricating an aerodynamic airframe structure and the like using a mold having halves with a cavity formed therein, the cavity designed for receiving an external stiffener skin having injection holes along the length thereof. the mold further having an entrance connected to a runner along one side of the cavity and a series of gates joining the runner to the cavity and indexed with the injection holes, the steps including:
   circulating a foam material from holding tanks;
   receiving the foam material from the holding tanks and mixing the material in a mixing chamber;
   introducing the mixed foam material under pressure into the entrance of the mold;
   mixing the foam material in an aftermixer in the mold so that the flow velocity of the foam material is redirected from turbulant flow to laminer flow prior to entering the runner;
   feeding the mixed foam material from the aftermixer along the length of the runner and through the gates;
   filling the external skin in the cavity through the injection holes with the foam material, the foam material adhering to the skin and forming an elastic foundation for the external skin; and
   curing the airframe structure and removing the halves of the mold therefrom.

5. A mold for forming an aerodynamic airframe structure or the like, the mold including:
   an upper half and a lower half, the halves indexed together and having:
   an entrance into the halves;
   a cavity formed into the halves and adapted for receiving an external stiffener skin having injection holes along the length thereof for forming an airframe structure;
   a runner in one side of the split halves and along one side of the cavity;
   a series of gates joining the runner to the cavity in the split half and indexed with the injection holes when the skin is received in the cavity; and
   an aftermixer disposed in one of the split halves and between the entrance and the runner for mixing the foam material and redirecting the flow velocity of the foam material from turbulent flow to laminer flow before the foam is introduced into the runner.

* * * * *